US009464554B2

(12) United States Patent
Matsuo et al.

(10) Patent No.: US 9,464,554 B2
(45) Date of Patent: Oct. 11, 2016

(54) EXHAUST GAS PURIFICATION SYSTEM FOR INTERNAL COMBUSTION ENGINE

(71) Applicants: Junichi Matsuo, Susono (JP); Nobumoto Ohashi, Shizuoka-ken (JP); Shigeki Nakayama, Gotenba (JP); Kenji Sakurai, Uji (JP); Akira Mikami, Susono (JP); Keishi Takada, Kanagawa-ken (JP); Yoshihisa Tsukamoto, Susono (JP); Hiroshi Otsuki, Gotenba (JP); Ichiro Yamamoto, Kariya (JP)

(72) Inventors: Junichi Matsuo, Susono (JP); Nobumoto Ohashi, Shizuoka-ken (JP); Shigeki Nakayama, Gotenba (JP); Kenji Sakurai, Uji (JP); Akira Mikami, Susono (JP); Keishi Takada, Kanagawa-ken (JP); Yoshihisa Tsukamoto, Susono (JP); Hiroshi Otsuki, Gotenba (JP); Ichiro Yamamoto, Kariya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/648,727

(22) PCT Filed: Dec. 3, 2012

(86) PCT No.: PCT/JP2012/081266
§ 371 (c)(1),
(2) Date: Jun. 1, 2015

(87) PCT Pub. No.: WO2014/087466
PCT Pub. Date: Jun. 12, 2014

(65) Prior Publication Data
US 2015/0308320 A1 Oct. 29, 2015

(51) Int. Cl.
F01N 3/20 (2006.01)
F01N 9/00 (2006.01)
(Continued)

(52) U.S. Cl.
CPC ............... *F01N 9/00* (2013.01); *F01N 3/025* (2013.01); *F01N 3/0253* (2013.01); *F01N 3/035* (2013.01); *F01N 3/103* (2013.01); *F01N 3/106* (2013.01); *F01N 3/208* (2013.01); *F01N 3/2066* (2013.01); *F01N 9/002* (2013.01); *F01N 11/002* (2013.01); *F01N 13/009* (2014.06);
(Continued)

(58) Field of Classification Search
CPC ...... F01N 3/106; F01N 9/002; F01N 11/002; F01N 13/0253; F01N 2570/18; F01N 2900/1602; F01N 2900/1621
See application file for complete search history.

(56) References Cited

U.S. PATENT DOCUMENTS

2005/0031514 A1 2/2005 Patchett et al.
2007/0137184 A1 6/2007 Patchett et al.
(Continued)

FOREIGN PATENT DOCUMENTS

JP 2007-501353 1/2007

*Primary Examiner* — Jonathan Matthias
(74) *Attorney, Agent, or Firm* — Finnegan, Henderson, Farabow, Garrett & Dunner LLP

(57) ABSTRACT

In an exhaust gas purification system for an internal combustion engine provided with a filter supporting an SCR catalyst, the present invention is intended to suppress HC and CO from being discharged to the outside at the time of the execution of filter regeneration processing, and to carry out the filter regeneration processing in an efficient manner. In the present invention, a post-catalyst having an oxidation function is arranged in an exhaust passage at the downstream side of the filter. Then, when the temperature of the post-catalyst is lower than a predetermined activation temperature at the time the execution of the filter regeneration processing is requested, the temperature of the post-catalyst is raised by carrying out control of raising the temperature of the exhaust gas discharged from the internal combustion engine, and control increasing the flow rate of the exhaust gas, before the execution of the filter regeneration processing.

3 Claims, 5 Drawing Sheets

(51) Int. Cl.
    *F01N 3/035*      (2006.01)
    *F01N 3/10*      (2006.01)
    *F02D 41/02*      (2006.01)
    *F01N 3/025*      (2006.01)
    *F01N 13/00*      (2010.01)
    *F01N 11/00*      (2006.01)

(52) U.S. Cl.
    CPC ........ *F02D 41/024* (2013.01); *F01N 2430/00* (2013.01); *F01N 2560/06* (2013.01); *F01N 2560/14* (2013.01); *F01N 2570/18* (2013.01); *F01N 2610/02* (2013.01); *F01N 2900/0416* (2013.01); *F01N 2900/1404* (2013.01); *F01N 2900/1602* (2013.01); *F02D 41/029* (2013.01); *Y02T 10/24* (2013.01); *Y02T 10/26* (2013.01); *Y02T 10/47* (2013.01)

(56) References Cited

U.S. PATENT DOCUMENTS

| | | |
|---|---|---|
| 2008/0132405 A1 | 6/2008 | Patchett et al. |
| 2009/0255241 A1 | 10/2009 | Patchett et al. |
| 2011/0064632 A1* | 3/2011 | Huang ............... B01D 53/9477 423/212 |
| 2012/0034133 A1 | 2/2012 | Patchett et al. |
| 2014/0349841 A1 | 11/2014 | Patchett et al. |
| 2015/0011377 A1 | 1/2015 | Patchett et al. |
| 2015/0126358 A1 | 5/2015 | Patchett et al. |

* cited by examiner

EXHAUST GAS PURIFICATION SYSTEM FOR INTERNAL COMBUSTION ENGINE

CROSS-REFERENCE TO RELATED APPLICATIONS

This application is a national phase application of International Application No. PCT/JP2012/081266, filed Dec. 3, 2012, the content of which is incorporated herein by reference.

TECHNICAL FIELD

The present invention relates to an exhaust gas purification system for an internal combustion engine.

BACKGROUND ART

In the past, as an exhaust gas purification apparatus arranged in an exhaust passage of an internal combustion engine, there has been developed one in which a filter that supports thereon an NOx selective reduction catalyst (hereinafter, referred to as an SCR catalyst) (see, for example, Patent literature 1). The filter traps particulate matter (hereinafter, referred to as PM) in exhaust gas. The SCR catalyst serves to reduce NOx in the exhaust gas by using ammonia ($NH_3$) as a reducing agent. Hereinafter, a filter supporting such an SCR catalyst thereon may also be referred to as an SCRF.

By adopting the SCRF as an exhaust gas purification apparatus, the size of the exhaust gas purification apparatus can be made smaller in comparison with the case where the filter and the SCR catalyst are separately arranged in the exhaust passage. As a result, mountability of the exhaust gas purification apparatus can be improved. In addition, by the adoption of the SCRF, it becomes possible to arrange the SCR catalyst at a location more upstream in the exhaust passage. At the more upstream side in the exhaust passage, the SCR catalyst is arranged, the easier it becomes for the SCR catalyst to be heated by the heat of the exhaust gas. For that reason, it is possible to attain an improvement in the warm-up performance of the SCR catalyst as well as an improvement in the rate of NOx reduction in the SCR catalyst.

Here, the PM trapped by the SCRF deposits or accumulates therein. For that reason, in an exhaust gas purification system provided with the SCRF, filter regeneration processing is carried out. The filter regeneration processing is to oxidize and remove the PM deposited in the SCRF. The filter regeneration processing is achieved by supplying fuel to a pre-catalyst having an oxidation function which is arranged in the exhaust passage at the upstream side of the SCRF. When the fuel is oxidized in the pre-catalyst, the exhaust gas flowing into the SCRF will be heated by the heat of oxidation. For that reason, the temperature of the SCRF can be raised to a filter regeneration temperature at which the oxidation of the PM is promoted.

PRIOR ART LITERATURES

Patent Literatures

Patent Literature 1: Japanese Unexamined Patent Application Publication No. 2007-501353

SUMMARY OF THE INVENTION

Problems to be Solved by the Invention

Ammonia or a precursor of ammonia is supplied to the SCRF. Then, in the SCR catalyst supported on the SCRF, the NOx in the exhaust gas is reduced by the ammonia, which acts as a reducing agent. Here, when the ammonia is oxidized, there may be generated NOx. It is necessary to suppress the generation of such NOx, so it is difficult for a catalyst of high oxidizing ability to be supported on the SCRF. Accordingly, the SCR catalyst supported on the SCRF has very low oxidizing ability.

When the above-mentioned filter regeneration processing is carried out, a part of hydrocarbon (HC) and carbon monoxide (CO) contained in the fuel supplied to the pre-catalyst may pass through the pre-catalyst without being oxidized in the pre-catalyst. The HC and CO having passed through the pre-catalyst flow into the SCRF. However, as mentioned above, the SCR catalyst supported on the SCRF has very low oxidizing ability. For that reason, when the HC and CO pass through the pre-catalyst, these HC and CO will also pass through the SCRF.

In addition, when the filter regeneration processing is executed, the PM deposited in the SCRF is oxidized to generate CO. In the SCRF, this CO is also difficult to be oxidized. Accordingly, at the time of the execution of the filter regeneration processing, there is a fear that the HC and CO contained in the fuel and the CO generated by the oxidation of the PM may flow out of the SCRF.

The present invention has been made in view of the problems as mentioned above, and has for its object to provide a technology in which in an exhaust gas purification system for an internal combustion engine provided with an SCRF, HC and CO can be suppressed from being discharged to the outside at the time of the execution of filter regeneration processing, and the filter regeneration processing can be carried out in an efficient manner.

Means for Solving the Problems

In the present invention, a post-catalyst is arranged in an exhaust passage at the downstream side of an SCRF. The post-catalyst has an oxidation function. Then, when the temperature of the post-catalyst is lower than a predetermined activation temperature at the time the execution of filter regeneration processing is requested, the temperature of the post-catalyst is raised by carrying out control of raising the temperature of the exhaust gas discharged from the internal combustion engine, and control of increasing the flow rate of the exhaust gas, before the execution of the filter regeneration processing.

More specifically, an exhaust gas purification system for an internal combustion engine according to the present invention comprises:

a pre-catalyst that is arranged in an exhaust passage of the internal combustion engine and has an oxidation function;

a fuel supply device configured to supply fuel to said pre-catalyst;

a filter that is arranged in the exhaust passage at a location downstream of said pre-catalyst for trapping particulate matter in exhaust gas, and supports thereon an NOx selective reduction catalyst which serves to reduce NOx in the exhaust gas by using ammonia as a reducing agent;

an ammonia supply device configured to supply ammonia or a precursor of ammonia to said filter;

a post-catalyst that is arranged in the exhaust passage at a location downstream of said filter, and has an oxidation function; and a filter regeneration processing execution unit configured to carryout filter regeneration processing in which fuel is supplied from said fuel supply device to said pre-catalyst thereby to raise the temperature of said filter to a predetermined filter regeneration temperature at which oxidation of the particulate matter is promoted, whereby the particulate matter deposited in said filter is oxidized and removed;

wherein when the temperature of said post-catalyst is lower than a predetermined activation temperature at the time the execution of said filter regeneration processing is requested, the temperature of said post-catalyst is raised to a temperature equal to or higher than said predetermined activation temperature by carrying out control of raising the temperature of the exhaust gas discharged from the internal combustion engine, and control of increasing the flow rate of the exhaust gas, before the execution of said filter regeneration processing by said filter regeneration processing execution unit.

In the exhaust gas purification system for an internal combustion engine according to the present invention, the pre-catalyst, the SCRF (filter) and the post-catalyst are arranged sequentially from an upstream side in the exhaust passage of the internal combustion engine. Then, ammonia or the precursor of ammonia is supplied to the SCRF. In the SCR (NOx selective catalytic reduction) catalyst supported on the SCRF, the NOx in the exhaust gas is reduced by using, as a reducing agent, the ammonia thus supplied or ammonia generated from the precursor of ammonia thus supplied. In addition, the filter regeneration processing for removing the PM deposited in the SCRF is achieved or carried out by supplying fuel from the fuel supply device to the pre-catalyst.

When the filter regeneration processing is carried out, HC and CO having passed through the pre-catalyst and the SCRF without being oxidized in the pre-catalyst flow into the post-catalyst. At this time, when the oxidation function of the post-catalyst is activated to a sufficient extent, HC and CO can be oxidized in the post-catalyst.

Accordingly, in the present invention, when the temperature of the post-catalyst is lower than the predetermined activation temperature at the time the execution of filter regeneration processing is requested, the temperature of the post-catalyst is raised to the predetermined activation temperature or above by carrying out the control of raising the temperature of the exhaust gas discharged from the internal combustion engine, and the control of increasing the flow rate of the exhaust gas, before carrying out the filter regeneration processing by means of the filter regeneration processing execution unit (i.e., before carrying out the supply of fuel from the fuel supply device to the pre-catalyst). Here, the predetermined activation temperature is a temperature at which the HC and CO flowing into the post-catalyst can be oxidized to a sufficient extent.

According to the control of raising the temperature of the exhaust gas discharged from the internal combustion engine, it is possible to raise the temperature of the exhaust gas flowing into the post-catalyst, while suppressing an increase in HC and CO in the exhaust gas in comparison with the case where fuel is supplied from the fuel supply unit to the pre-catalyst. Then, by raising the temperature of the exhaust gas flowing into the post-catalyst, the amount of heat supplied to the post-catalyst by the exhaust gas can be made to increase.

In addition, by increasing the flow rate of the exhaust gas, it becomes difficult for the amount of heat of the exhaust gas to be taken by the pre-catalyst and the SCRF, which are arranged at the upstream side of the post-catalyst. For that reason, the amount of heat supplied to the post-catalyst by the exhaust gas can be made to increase to a more extent. Accordingly, it becomes possible to promote the rise in temperature of the post-catalyst to a more extent.

According to the present invention, the filter regeneration processing is carried out when the temperature of the post-catalyst is equal to or more than the predetermined activation temperature. Accordingly, it is possible to suppress HC and CO from being discharged to the outside at the time of the execution of the filter regeneration processing. On the other hand, when the activation of the oxidation function of the post-catalyst is insufficient, it is possible to quickly enhance the oxidation function of the post-catalyst to a sufficient level. Accordingly, it becomes possible to start the execution of the filter regeneration processing at an earlier period of time. For that reason, the filter regeneration processing can be carried out in an efficient manner.

In the present invention, in cases where the temperature of the filter is lower than a predetermined filter temperature when the temperature of the post-catalyst at the time the execution of the filter regeneration processing is requested is lower than the predetermined activation temperature, the execution of the control of increasing the flow rate of the exhaust gas may be inhibited. In addition, in the present invention, in cases where the rate of NOx reduction in the SCR catalyst supported on the SCRF is lower than a predetermined rate of reduction when the temperature of the post-catalyst at the time the execution of the filter regeneration processing is requested is lower than the predetermined activation temperature, the execution of the control of increasing the flow rate of the exhaust gas may be inhibited.

According to these, it is possible to suppress the amount of NOx flowing into the SCRF from increasing when the rate of NOx reduction in the SCR catalyst supported on the SCRF is in an insufficient state. For that reason, it is also possible to suppress the increase in the amount of discharge of NOx to the outside.

In the present invention, in cases where the temperature of the filter is lower than a predetermined filter temperature when the temperature of the post-catalyst at the time the execution of the filter regeneration processing is requested is lower than the predetermined activation temperature, an amount of increase at the time of increasing the flow rate of the exhaust gas may also be made smaller than when the temperature of the filter is equal to or higher than the predetermined filter temperature. Moreover, in the present invention, in cases where the rate of NOx reduction in the SCR catalyst supported on the SCRF is lower than a predetermined rate of reduction when the temperature of the post-catalyst at the time the execution of the filter regeneration processing is requested is lower than the predetermined activation temperature, an amount of increase at the time of increasing the flow rate of the exhaust gas may also be made smaller when the rate of NOx reduction in the SCR catalyst is equal to or higher than the predetermined rate of reduction.

According to these, an excessive increase in the amount of discharge of NOx to the outside can be suppressed, while promoting the temperature rise of the post-catalyst.

Advantageous Effects of the Invention

According to the present invention, in an exhaust gas purification system for an internal combustion engine provided with an SCRF, HC and CO can be suppressed from being discharged to the outside at the time of the execution of filter regeneration processing, and the filter regeneration processing can be carried out in an efficient manner.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Here, description will be made by taking as an example a case in which an exhaust gas purification system for an internal combustion engine according to the present invention is applied to a diesel engine for driving a vehicle. However, it is to be noted that the internal combustion engine according to the present invention is not limited to a diesel engine, but may be a gasoline engine, etc.

[Schematic Construction of Intake and Exhaust Systems]

Figure 1:
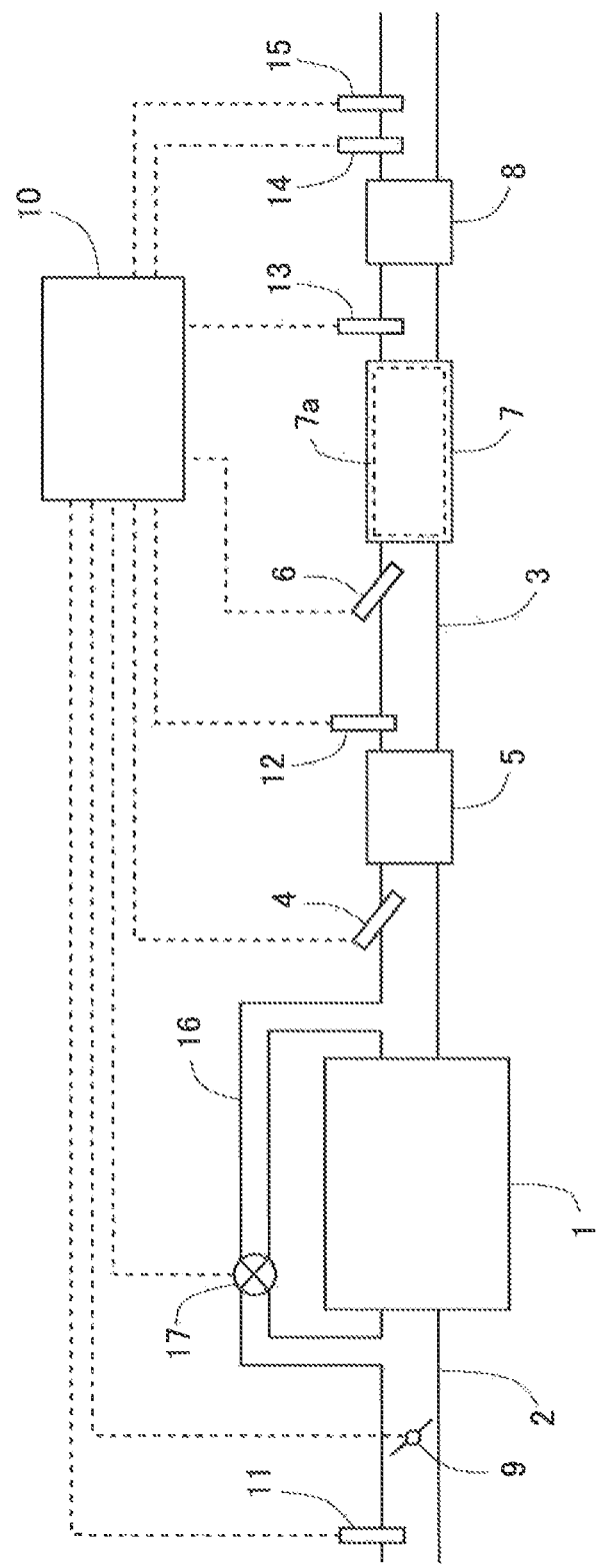
FIG. 1 This is a view showing the schematic construction of intake and exhaust systems of an internal combustion engine according to a first embodiment of the present invention.

FIG. 1 is a view showing the schematic construction of intake and exhaust systems of an internal combustion engine according to this first embodiment. The internal combustion engine 1 is a diesel engine for driving a vehicle. An intake passage 2 and an exhaust passage 3 are connected to the internal combustion engine 1. In the intake passage 2, there are arranged an air flowmeter 11 and a throttle valve 9. The air flowmeter 11 serves to detect an amount of intake air sucked into the internal combustion engine 1. The throttle valve 9 serves to adjust the amount of intake air sucked into the internal combustion engine 1.

In the exhaust passage 3, there are arranged a fuel addition valve 4, a pre-catalyst 5, a first exhaust gas temperature sensor 12, an ammonia addition valve 6, an SCRF 7, a second exhaust gas temperature sensor 13, a post-catalyst 8, a third exhaust gas temperature sensor 14, and an NOx sensor 15, sequentially from an upstream side along the flow of exhaust gas.

The pre-catalyst 5 is an oxidation catalyst. However, the pre-catalyst 5 may be a catalyst other than the oxidation catalyst, as long as it has an oxidation function. In order to supply fuel to the pre-catalyst 5, the fuel addition valve 4 adds fuel into the exhaust gas.

Here, note that in this embodiment, the fuel addition valve 4 corresponds to a fuel supply device according to the present invention. However, the fuel addition valve 4 may not be provided, but fuel can also be supplied to the pre-catalyst 5 in the internal combustion engine 1 by carrying out auxiliary fuel injection at the timing at which injected fuel is discharged into the exhaust passage 3 in an unburnt state without being used for combustion.

The SCRF 7 is constructed such that an SCR catalyst 7a is supported on a wall flow type filter which serves to trap particulate matter (PM) in the exhaust gas. The SCR catalyst 7a serves to reduce NOx in the exhaust gas by using ammonia as a reducing agent. The ammonia addition valve 6 supplies ammonia gas into the exhaust gas so as to supply ammonia to the SCRF 7. When the ammonia is supplied to the SCRF 7, the ammonia once adsorbs to the SCR catalyst 7a supported on the SCRF 7. Then, the NOx in the exhaust gas is reduced by the adsorbed ammonia acting as a reducing agent.

Here, note that in this embodiment, the ammonia addition valve 6 corresponds to an ammonia supply device according to the present invention. However, the ammonia supply device according to the present invention may be a device which supplies ammonia as liquid or solid. In addition, the ammonia supply device according to the present invention may be a device which supplies a precursor of ammonia. For example, in this embodiment, in place of the ammonia addition valve 6, provision may be made for a urea addition valve that serves to add an aqueous urea solution into the exhaust gas. In this case, urea is supplied to the SCRF 7 as the precursor of ammonia. Then, the urea is hydrolyzed to generate ammonia.

The post-catalyst 8 is an oxidation catalyst. However, the post-catalyst 8 may be another catalyst having an oxidation function. In addition, the post-catalyst 8 may be a catalyst which is composed by combining an oxidation catalyst and an SCR catalyst which serves to reduce the NOx in the exhaust gas by using ammonia as a reducing agent. In this case, the oxidation catalyst may be formed, for example, by carrying a precious metal such as platinum (Pt), etc., on a carrier made of a material such as aluminum oxide ($Al_2O_3$), zeolite, etc., and the SCR catalyst may be formed by carrying a base metal such as copper (Cu), iron (Fe), etc., on a carrier made of a material such as zeolite. By forming the post-catalyst 8 into the catalyst of such a configuration, HC, CO and ammonia in the exhaust gas can be oxidized, and further, a part of ammonia is oxidized to generate NOx, and the NOx thus generated can also be reduced by using excessive or surplus ammonia as a reducing agent.

The first exhaust gas temperature sensor 12, the second exhaust gas temperature sensor 13, and the third exhaust gas temperature sensor 14 are each a sensor for detecting the temperature of the exhaust gas. The first exhaust gas temperature sensor 12 detects the temperature of the exhaust gas which flows out from the pre-catalyst 5. The second exhaust gas temperature sensor 13 detects the temperature of the exhaust gas which flows out from the SCRF 7. The third exhaust gas temperature sensor 14 detects the temperature of the exhaust gas which flows out from the post-catalyst 8. The NOx sensor 15 detects the amount of NOx in the exhaust gas.

In addition, an EGR passage 16 has one end thereof connected to the exhaust passage 3 at a location upstream of the fuel addition valve 4. The EGR passage 16 has the other end thereof connected to the intake passage 2 at a location downstream of the throttle valve 9. Moreover, an EGR valve 17 is arranged in the EGR passage 16.

According to such a construction, a part of the exhaust gas discharged from the internal combustion engine 1 is introduced as EGR gas into the intake passage 2 through the EGR passage 16. With this, the EGR gas is supplied to the internal combustion engine 1. In addition, the flow rate of the EGR gas introduced into the intake passage 2 through the EGR passage 16 is adjusted by means of the EGR valve 17.

An electronic control unit (ECU) 10 is provided in combination with the internal combustion engine 1. The ECU 10 is electrically connected to a variety of kinds of sensors such as the air flow meter 11, the first exhaust gas temperature sensor 12, the second exhaust gas temperature sensor 13, the third exhaust gas temperature sensor 14, the NOx sensor 15, and so on. Then, output signals of these various kinds of sensors are inputted to the ECU 10. The ECU 10 estimates the flow rate of the exhaust gas in the exhaust passage 3 based on the output value of the air flow meter 11. Further, the ECU 10 estimates the temperature of the pre-catalyst 5 based on the output value of the first exhaust gas temperature sensor 12, the temperature of the SCRF 7 (i.e., the temperature of the SCR catalyst 7a) based on the output value of the second exhaust gas temperature sensor 13, and the temperature of the post-catalyst 8 based on the output value of the third exhaust gas temperature sensor 14.

Further, the throttle valve 9, the fuel addition valve 4, the ammonia addition valve 6, and the EGR valve 17 are electrically connected to the ECU 10. Then, these valves are controlled by means of the ECU 10.

[Filter Regeneration Processing]

In the SCRF 7, particulate matter (PM) trapped thereby gradually deposits or accumulates therein. Accordingly, in this embodiment, filter regeneration processing is carried out by means of the ECU 10 in order to remove the PM deposited in the SCRF 7. The filter regeneration processing according to this embodiment is achieved by adding fuel into the exhaust gas from the fuel addition valve 4 thereby to supply the fuel to the pre-catalyst 5.

When fuel is oxidized in the pre-catalyst 5, heat of oxidation is generated. The exhaust gas flowing into the SCRF 7 is heated by this heat of oxidation. As a result of this, the temperature of SCRF 7 goes up. At the time of carrying out the filter regeneration processing, by controlling the amount of fuel to be added from the fuel addition valve 4, the temperature of the SCRF 7 is caused to rise to a predetermined filter regeneration temperature (e.g., 600-650 degrees C.) at which the oxidation of the PM is promoted. As a result, the PM deposited in the SCRF 7 is oxidized and removed.

In this embodiment, each time a predetermined period of time elapses after the execution of the last filter regeneration processing ends, the execution of the filter regeneration processing is requested. Here, note that each time the vehicle with the internal combustion engine 1 mounted thereon travels a predetermined travel distance, the execution of the filter regeneration processing may also instead be requested. In addition, each time the amount of PM deposition in the SCRF 7 reaches a predetermined amount of deposition, the execution of the filter regeneration processing may also be requested. The amount of PM deposition in the SCRF 7 can be estimated based on the histories of the amount of fuel injection in the internal combustion engine 1, the flow rate of the exhaust gas flowing into the SCRF 7, the temperature of the SCRF 7, and so on.

Then, in cases where the temperature of the pre-catalyst 5 is higher than a predetermined first activation temperature at the time the execution of the filter regeneration processing is requested, the filter regeneration processing is carried out (i.e., the addition of fuel from the fuel addition valve 4 is carried out). Here, the first activation temperature is a temperature at which the fuel added from the fuel addition valve 4 can be oxidized in the pre-catalyst 5 to a certain extent. This first activation temperature is a temperature which is decided according to the kind and configuration of the pre-catalyst 5, and has been set in advance based on experiments, etc.

When the filter regeneration processing is carried out by adding fuel from the fuel addition valve 4, a part of hydrocarbon (HC) and carbon monoxide (CO) contained in the fuel supplied to the pre-catalyst 5 may pass through the pre-catalyst 5 without being oxidized in the pre-catalyst 5. The HC and CO having passed through the pre-catalyst 5 flow into the SCRF 7. However, the SCR catalyst 7a supported on the SCRF 7 has very low oxidizing ability, so the HC and CO are difficult to be oxidized in the SCR catalyst 7a. For that reason, the HC and CO having passed through the pre-catalyst 5 will also pass through the SCRF 7.

In addition, when the filter regeneration processing is executed, the PM deposited in the SCRF 7 is oxidized to generate CO. In the SCRF 7, this CO is also difficult to be oxidized. Accordingly, at the time of the execution of the filter regeneration processing, there is a fear that the HC and CO contained in the fuel and the CO generated by the oxidation of the PM may flow out of the SCRF 7.

Here, in this embodiment, the post-catalyst 8 is arranged in the exhaust passage 3 at the downstream side of the SCRF 7. When the filter regeneration processing is carried out, the HC and CO having passed through the pre-catalyst 5 and the SCRF 7 without being oxidized in the pre-catalyst 5 flow into the post-catalyst 8. At this time, when the oxidation function of the post-catalyst 8 is activated to a sufficient extent, the HC and CO can be oxidized in the post-catalyst 8.

Accordingly, in this embodiment, when the temperature of the post-catalyst 8 is lower than a predetermined second activation temperature at the time the execution of the filter regeneration processing is requested, the temperature of the post-catalyst is raised to the predetermined activation temperature or above by performing exhaust gas temperature raising control and exhaust gas flow rate increasing control, before carrying out the filter regeneration processing (i.e., before carrying out the addition of fuel from the fuel addition valve 4).

Here, the second activation temperature is a temperature at which the HC and CO flowing into the post-catalyst 8 can be oxidized to a sufficient extent in the post-state catalyst 8. This second activation temperature is a temperature which is decided according to the kind and configuration of the post-catalyst 8, and has been set in advance based on experiments, etc. Here, note that in this embodiment, this second activation temperature corresponds to a predetermined activation temperature according to the present invention.

The exhaust gas temperature raising control is the control of raising the temperature of the exhaust gas discharged from the internal combustion engine 1. As this exhaust gas temperature raising control, there can be mentioned, by way of example, the control of carrying out an auxiliary fuel injection at the timing which is later than a main combustion injection in one combustion cycle and at which injected fuel is provided to combustion, in the internal combustion engine 1.

The exhaust gas flow rate increasing control is the control of increasing the flow rate of the exhaust gas flowing through the exhaust passage 3. As the exhaust gas flow rate increasing control, there can be mentioned, by way of example, the control of increasing the amount of intake air by making large the degree of opening of the throttle valve 9, or the control of decreasing the amount of EGR gas by making small the degree of opening of the EGR valve 17.

By raising the temperature of the exhaust gas discharged from the internal combustion engine 1 by means of the exhaust gas temperature raising control, it is possible to raise the temperature of the exhaust gas flowing into the post-catalyst 8, while suppressing an increase in HC and CO in the exhaust gas, in comparison with the case where fuel is added from the fuel addition valve 4 and the fuel thus added is oxidized in the pre-catalyst 5. Then, by raising the temperature of the exhaust gas flowing into the post-catalyst 8, the amount of heat supplied to the post-catalyst 8 by the exhaust gas can be made to increase.

Moreover, by increasing the flow rate of the exhaust gas flowing through the exhaust passage 3 by means of the exhaust gas flow rate increasing control, it becomes difficult for the amount of heat of the exhaust gas to be taken by the pre-catalyst 5 and the SCRF 7, which are arranged at the upstream side of the post-catalyst 8. In other words, it is possible to keep higher the temperature of the exhaust gas flowing into the post-catalyst 8. For that reason, the amount of heat supplied to the post-catalyst 8 by the exhaust gas can be made to increase to a more extent. Accordingly, it becomes possible to promote the rise in temperature of the post-catalyst 8 to a more extent.

Figure 2:
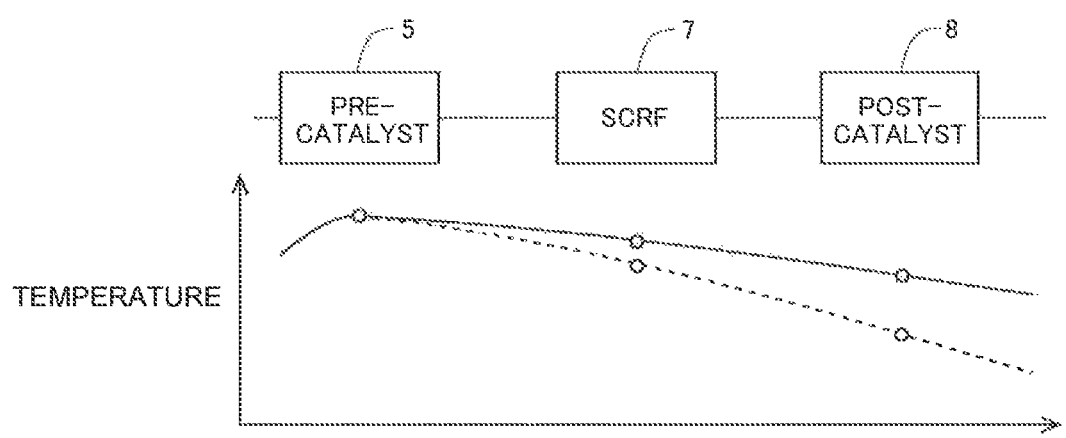
FIG. 2 This is a view showing the relation of the temperatures of a pre-catalyst, an SCRF, and a post-catalyst, with respect to the flow rate of exhaust gas when exhaust gas temperature raising control is carried out, according to the first embodiment.

FIG. 2 is a view showing the relation of the temperatures of the pre-catalyst 5, the SCRF 7 and the post-catalyst 8, with respect to the flow rate of the exhaust gas when the exhaust gas temperature raising control is carried out, according to the first embodiment. In FIG. 2, a broken line shows the temperatures when the flow rate of the exhaust gas is relatively small, and a solid line shows the temperatures when the flow rate of the exhaust gas is relatively large. As shown in FIG. 2, at the time of the execution of the filter regeneration processing, the temperature of the post-catalyst 8 becomes higher when the flow rate of the exhaust gas is large, in comparison with the time when the flow rate of the exhaust gas is small.

According to the above, the filter regeneration processing is carried out when the temperature of the post-catalyst 8 is equal to or more than the second activation temperature. In other words, the filter regeneration processing is carried out under the state where the oxidizing ability of the post-catalyst 8 has been activated to a sufficient extent. Accordingly, it is possible to suppress HC and CO from being discharged to the outside at the time of the execution of the filter regeneration processing.

Further, when the activation of the oxidation function of the post-catalyst 8 is insufficient at the time the execution of the filter regeneration processing has been requested, it is possible to quickly enhance the oxidation function of the post-catalyst 8 to a sufficient level. Accordingly, it becomes possible to start the execution of the filter regeneration processing at an earlier period of time. For that reason, the filter regeneration processing can be carried out in an efficient manner.

[Flow of Start of Execution of Filter Regeneration Processing]

Figure 3:
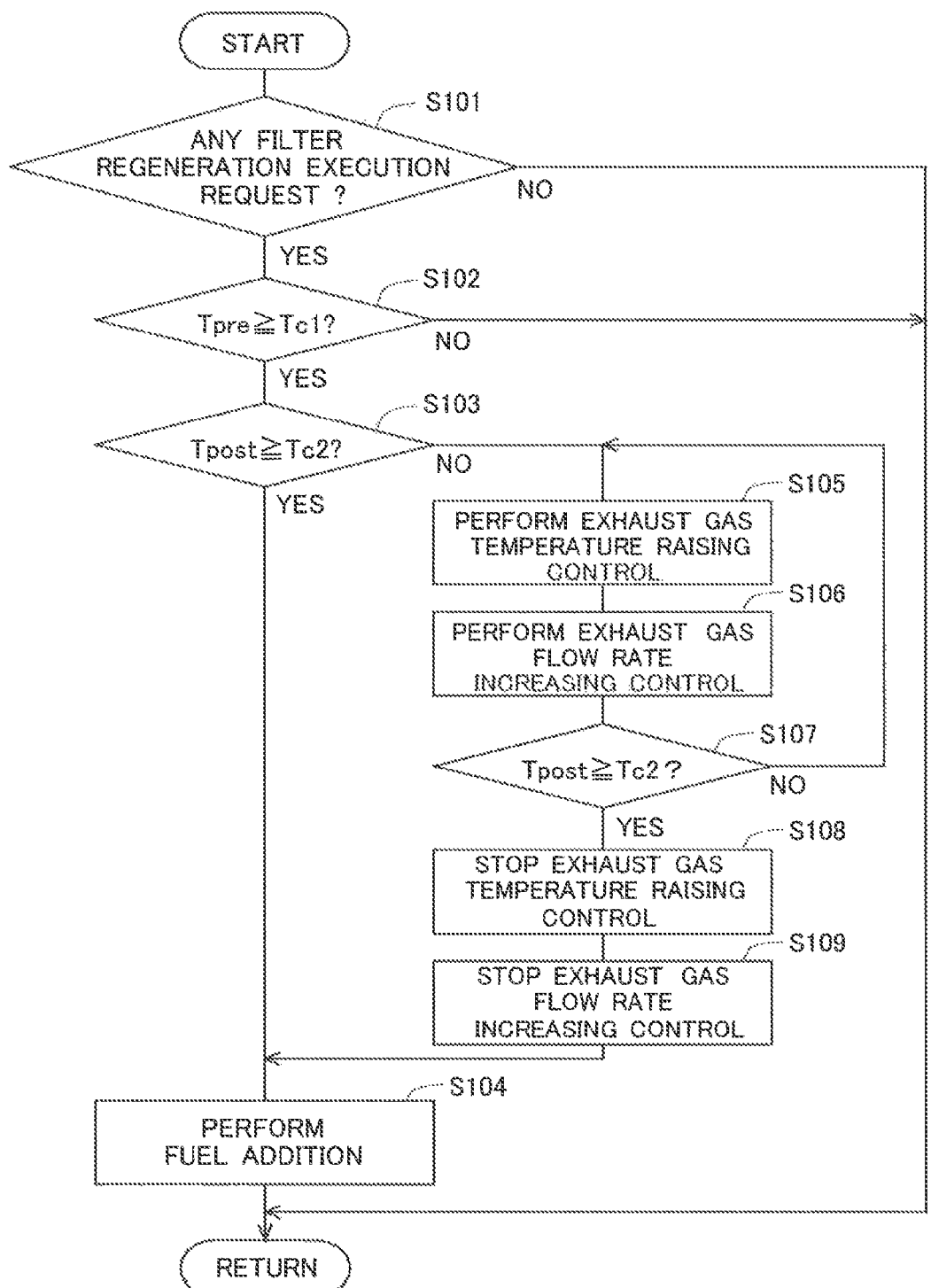
FIG. 3 This is a flowchart showing a flow of the start of the execution of filter regeneration processing according to the first embodiment.

Here, reference will be made to a flow of the start of the execution of filter regeneration processing according to this embodiment, based on FIG. 3. FIG. 3 is a flow chart showing the flow of the start of the execution of filter regeneration processing according to this embodiment. This flow has been stored in advance in the ECU 10, and is executed by the ECU 10 in a repeated manner.

In this flow, first in step S101, it is determined whether there is a request for the execution of filter regeneration processing. As mentioned above, in this embodiment, each time a predetermined period of time has elapsed after the execution of the last filter regeneration processing ends, the execution of filter regeneration processing is requested. In cases where a negative determination is made in step S101, the execution of this flow is once ended. On the other hand, in cases where an affirmative determination is made in step S101, the processing of step S102 is then carried out.

In step S102, it is determined whether the temperature Tpre of the pre-catalyst 5 is equal to or higher than the predetermined first activation temperature Tc1. As stated above, the first activation temperature Tc1 has been set based on experiments, etc., and stored in the ECU 10 in advance. In cases where the temperature Tpre of the pre-catalyst 5 is lower than the first activation temperature Tc1, even if fuel is added from the fuel addition valve 4, the fuel is difficult to be oxidized in the pre-catalyst 5. For that reason, in cases where a negative determination is made in step S102, the execution of this flow is once ended. On the other hand, in cases where an affirmative determination is made in step S102, the processing of step S103 is then carried out.

In step S103, it is determined whether the temperature Tpost of the post-catalyst 8 is equal to or higher than the predetermined second activation temperature Tc2. As stated above, the second activation temperature Tc2 has been set based on experiments, etc., and stored in the ECU 10 in advance. In cases where an affirmative determination is made in step S103, then in step S104, addition of fuel from the fuel addition valve 4 is carried out. That is, the execution of filter regeneration processing is started.

On the other hand, in cases where a negative determination is made in step S103, the processing of step S105 is then carried out. In step S105, the exhaust gas temperature raising control is carried out. An amount of rise in the temperature of the exhaust gas at this time may be set according to the temperature Tpost of the post-catalyst 8, the operating state of the internal combustion engine 1, etc., or may be a fixed amount which has been set in advance.

Subsequently, in step S106, the exhaust gas flow rate increasing control is carried out. An amount of increase in the flow rate of the exhaust gas at this time may be set according to the temperature Tpost of the post-catalyst 8, the operating state of the internal combustion engine 1, etc., or may be a fixed amount which has been set in advance.

Then, in step S107, it is determined again whether the temperature Tpost of the post-catalyst 8 is equal to or higher than the second activation temperature Tc2. In cases where a negative determination is made in step S107, the processing of step S105 and the processing of step S106 are then carried out again. That is, the execution of the exhaust gas temperature raising control and the exhaust gas flow rate increasing control is continued.

On the other hand, in cases where an affirmative determination is made in step S107, the processing of step S108 and the processing of step S109 are then carried out. In step S108, the execution of the exhaust gas temperature raising control is stopped. In step S109, the execution of the exhaust gas flow rate increasing control is stopped. Thereafter, the processing of step S104 is carried out. That is, the execution of the filter regeneration processing is started.

According to the above-mentioned flow, the execution of filter regeneration control is started in a state where the temperature of the post-catalyst 8 is equal to or higher than the second activation temperature. In addition, when the temperature of the post-catalyst 8 is lower than the second activation temperature at the time the execution of filter regeneration processing is requested, the temperature rise of the post-catalyst 8 is promoted by the execution of the exhaust gas temperature raising control and the exhaust gas flow rate increasing control.

Here, note that in this embodiment, also in cases where the temperature of the pre-catalyst 5 is equal to or more than the first activation temperature and the temperature of the post-catalyst 8 is equal to or more than the second activation temperature, at the time when the execution of filter regeneration processing is requested, filter regeneration processing may be carried out by performing the exhaust gas temperature raising control in addition to the addition of fuel from the fuel addition valve 4.

Second Embodiment

[Flow of Start of Execution of Filter Regeneration Processing]

Figure 4:
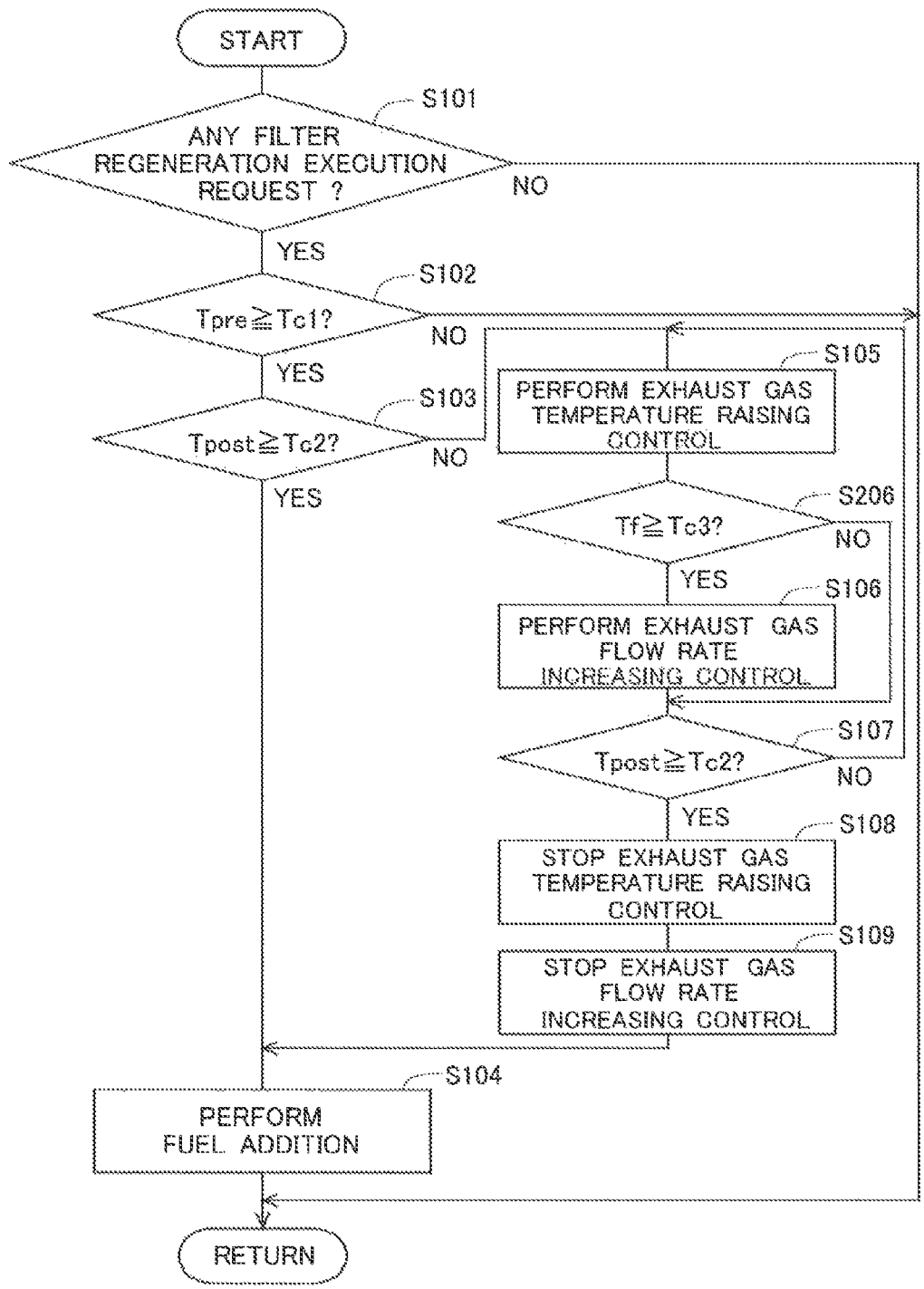
FIG. 4 This is a flowchart showing a flow of the start of the execution of filter regeneration processing according to a second embodiment.

Reference will be made to a flow of the start of the execution of filter regeneration processing according to this second embodiment, based on FIG. 4. FIG. 4 is a flow chart showing the flow of the start of the execution of filter regeneration processing according to this second embodiment. Here, reference will be made only to different features from the flow of the start of the execution of filter regeneration processing according to the first embodiment. In FIG. 4, for those steps in which the same processes as in the respective steps in the flow chart shown in FIG. 3, the same reference numerals and characters are attached and an explanation thereof is omitted. Here, note that the schematic construction of intake and exhaust systems of an internal combustion engine according to this second embodiment is the same as that in the first embodiment.

In this flow, the processing of step S206 is carried out after the processing of step S105. In step S206, it is determined whether the temperature Tf of the SCRF 7 is equal to or higher than a predetermined third activation temperature Tc3. In cases where an affirmative determination is made in step S206, the processing of step S106 is then carried out. That is, the exhaust gas flow rate increasing control is carried out. On the other hand, in cases where a negative determination is made in step S206, the processing of step S107 is then carried out, without performing the processing of step S106. That is, the execution of the exhaust gas flow rate increasing control is inhibited.

When the flow rate of the exhaust gas flowing through the exhaust passage 3 is made to increase by the exhaust gas flow rate image control, the amount of NOx flowing into the SCRF 7 increases. At this time, when the rate of NOx reduction in the SCR catalyst 7a supported on the SCRF 7 (i.e., the ratio of the amount of NOx reduced in the SCR catalyst 7a with respect to the amount of NOx flowing into the SCRF 7) is insufficient, the amount of discharge of NOx to the outside may increase to an excessive extent.

Accordingly, in this embodiment, as in the above-mentioned flow, in cases where the temperature of the SCRF 7 is lower than the third activation temperature, even at the time when the temperature of the post-catalyst 8 is lower than a second predetermined temperature, the execution of the exhaust gas flow rate increasing control is inhibited. Here, the third activation temperature is a temperature at which it can be judged that the NOx reduction function of the SCR catalyst 7a is activated to such an extent that even if the exhaust gas flow rate increasing control is carried out, the amount of discharge of NOx to the outside falls within an allowable range. This third activation temperature is a temperature which is decided according to the kind and configuration of the SCR catalyst 7a, and has been set in advance based on experiments, etc. Here, note that in this embodiment, this third activation temperature corresponds to a predetermined filter temperature according to the present invention.

According to this embodiment, it is possible to suppress the amount of NOx flowing into the SCRF 7 from increasing when the rate of NOx reduction in the SCR catalyst 7a supported on the SCRF 7 is in an insufficient state. For that reason, it is also possible to suppress the increase in the amount of discharge of NOx to the outside.

(Modification)

In a flow of the start of the execution of filter regeneration processing according to this modification, instead of inhibiting the execution of the exhaust gas flow rate increasing control, an amount of increase in the flow rate of the exhaust gas in the exhaust gas flow rate increasing control may also be made small. In other words, in cases where a negative determination is made in step S206 in the flow shown in FIG. 4, the exhaust gas flow rate increasing control may be carried out, by making the amount of increase in the flow rate of the exhaust gas smaller in comparison with the case where an affirmative determination is made in the step S206.

According to this, an excessive increase in the amount of discharge of NOx to the outside can be suppressed, while promoting the temperature rise of the post-catalyst 8.

Third Embodiment

[Flow of Start of Execution of Filter Regeneration Processing]

Figure 5:
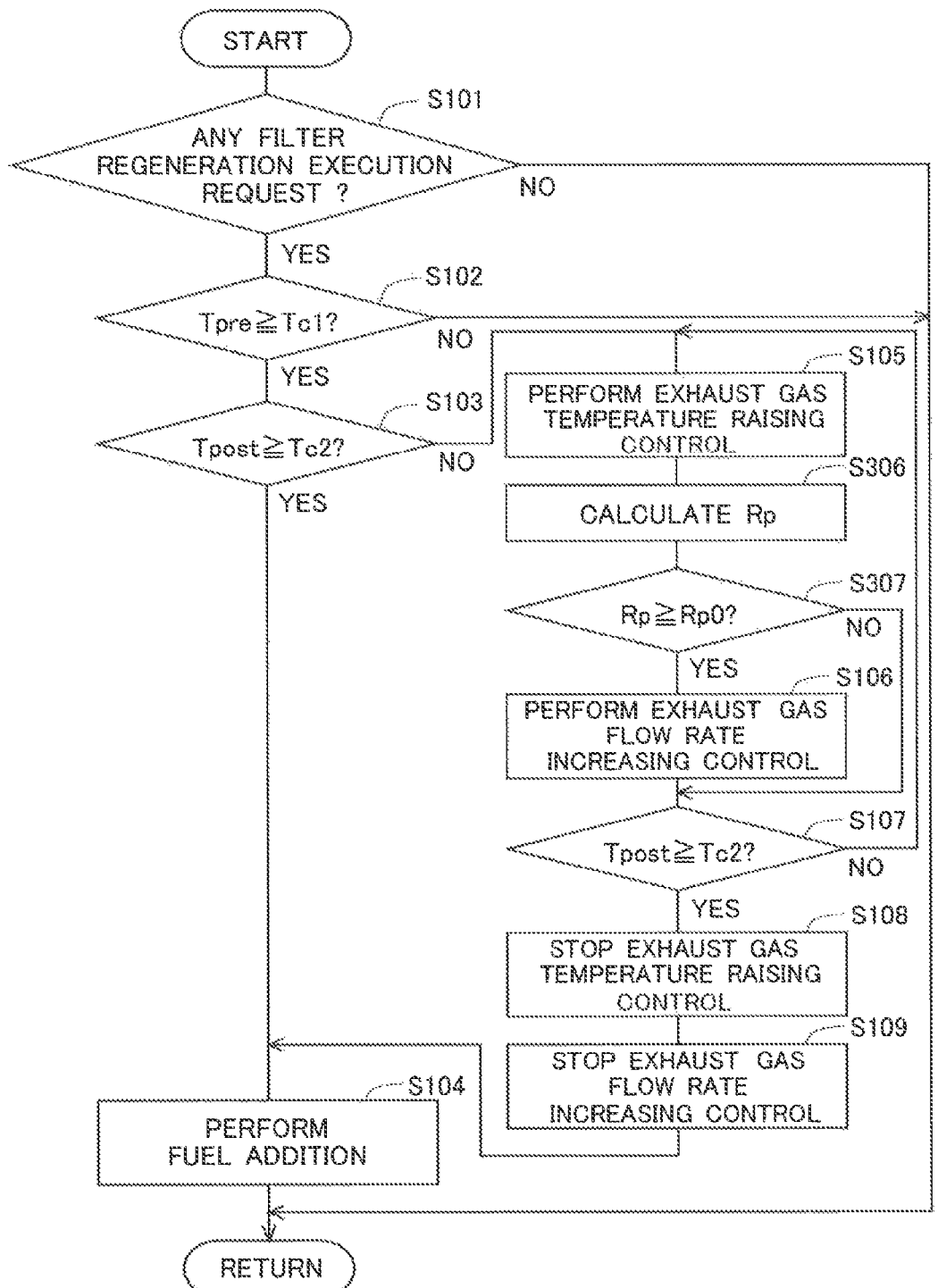
FIG. 5 This is a flowchart showing a flow of the start of the execution of filter regeneration processing according to a third embodiment.

Reference will be made to a flow of the start of the execution of filter regeneration processing according to this third embodiment, based on FIG. 5. FIG. 5 is a flowchart showing the flow of the start of the execution of filter regeneration processing according to this third embodiment. Here, reference will be made only to different features from the flow of the start of the execution of filter regeneration processing according to the first embodiment. In FIG. 5, for those steps in which the same processes as in the respective steps in the flow chart shown in FIG. 3, the same reference numerals and characters are attached and an explanation thereof is omitted. Here, note that the schematic construction of intake and exhaust systems of an internal combustion engine according to this third embodiment is the same as that in the first embodiment.

In this flow, the processing of step S306 is carried out after the processing of step S105. In step S306, the rate of NOx reduction Rp in the SCR catalyst 7a supported on the SCRF 7 is calculated. The amount of NOx in the exhaust gas flowing into the SCRF 7 can be estimated based on the operating state of the internal combustion engine 1, etc. In addition, the amount of NOx in the exhaust gas flowing out from the SCRF 7 can be detected by means of the NOx sensor 15. The rate of NOx reduction Rp in the SCR catalyst 7a can be calculated based on the estimated value and the detected value of the amount of NOx. Here, note that an NOx sensor may also be arranged in the exhaust passage 3 at the upstream side of the SCRF 7, so that the amount of NOx in the exhaust gas flowing into the SCRF 7 may be detected by this NOx sensor.

Subsequently, in step S307, it is determined whether the rate of NOx reduction Rp in the SCR catalyst 7a is equal to or more than a predetermined rate of reduction Rp0. In cases where an affirmative determination is made in step S307, the processing of step S106 is then carried out. That is, the exhaust gas flow rate increasing control is carried out. On the other hand, in cases where a negative determination is made in step S307, the processing of step S107 is then carried out, without performing the processing of step S106. That is, the execution of the exhaust gas flow rate increasing control is inhibited.

Here, the predetermined rate of reduction is a rate of NOx reduction in which even if the amount of NOx flowing into the SCRF 7 is increased by carrying out the exhaust gas flow rate increasing control, the amount of discharge of NOx to the outside falls within the allowable range. This predetermined rate of reduction is a value which is decided according to the kind and configuration of the SCR catalyst 7a, and has been set in advance based on experiments, etc.

According to the above-mentioned flow, in cases where the rate of NOx reduction in the SCR catalyst 7a is lower than the predetermined rate of reduction, even at the time when the temperature of the post-catalyst 8 is lower than the second predetermined temperature, the execution of the exhaust gas flow rate increasing control is inhibited. Accordingly, similar to the flow according to the second embodiment, it is possible to suppress the amount of NOx flowing into the SCRF 7 from increasing when the rate of NOx reduction in the SCR catalyst 7a supported on the SCRF 7 is in an insufficient state. For that reason, it is also possible to suppress the increase in the amount of discharge of NOx to the outside.

(Modification)

In a flow of the start of the execution of filter regeneration processing according to this modification, similar to the flow according to the second embodiment, instead of inhibiting the execution of the exhaust gas flow rate increasing control, an amount of increase in the flow rate of the exhaust gas in the exhaust gas flow rate increasing control may also be made small. In other words, in cases where a negative determination is made in step S307 in the flow shown in FIG. 5, the exhaust gas flow rate increasing control may be carried out, by making the amount of increase in the flow rate of the exhaust gas smaller in comparison with the case where an affirmative determination is made in the step S307.

According to this, an excessive increase in the amount of discharge of NOx to the outside can be suppressed, while promoting the temperature rise of the post-catalyst 8.

DESCRIPTION OF THE REFERENCE SIGNS

1 . . . internal combustion engine
2 . . . intake passage
3 . . . exhaust passage
4 . . . fuel addition valve
5 . . . pre-catalyst
6 . . . ammonia addition valve
7 . . . filter (SCRF)
7a . . . NOx selective reduction catalyst (SCR catalyst)
8 . . . post-catalyst
9 . . . throttle valve
10 . . . ECU
11 . . . air flow meter
12 . . . first exhaust gas temperature sensor
13 . . . second exhaust gas temperature sensor
14 . . . third exhaust gas temperature sensor
15 . . . NOx sensor
16 . . . EGR passage
17 . . . EGR valve

The invention claimed is:

1. An exhaust gas purification system for an internal combustion engine comprising:
   a pre-catalyst that is arranged in an exhaust passage of the internal combustion engine and has an oxidation function;
   a fuel supplier that supplies fuel to said pre-catalyst;
   a filter that is arranged in the exhaust passage at a location downstream of said pre-catalyst for trapping particulate matter in exhaust gas, and supports thereon an NOx selective reduction catalyst which serves to reduce NOx in the exhaust gas by using ammonia as a reducing agent;
   an ammonia supplier that supplies ammonia or a precursor of ammonia to said filter;
   a post-catalyst that is arranged in the exhaust passage at a location downstream of said filter, and has an oxidation function; and
   a controller comprising at least one processor configured to carry out filter regeneration processing in which fuel is supplied from said fuel supplier to said pre-catalyst thereby to raise the temperature of said filter to a predetermined filter regeneration temperature at which oxidation of the particulate matter is promoted, whereby the particulate matter deposited in said filter is oxidized and removed;
   wherein the controller is configured to, when the temperature of said post-catalyst is lower than a predetermined activation temperature at the time the execution of said filter regeneration processing is requested, raise the temperature of the post-catalyst to a temperature equal to or higher than the predetermined activation temperature by carrying out control of raising the temperature of the exhaust gas discharged from the internal combustion engine and increasing the flow rate of the exhaust gas before executing the filter regeneration processing.

2. The exhaust gas purification system for an internal combustion engine as set forth in claim 1, wherein the controller is configured to, when the temperature of said filter is lower than a predetermined filter temperature when the temperature of said post-catalyst at the time the execution of said filter regeneration processing is requested is lower than said predetermined activation temperature:
   inhibit execution of the control of increasing the flow rate of the exhaust gas; or
   increase the flowrate of the exhaust gas by a lesser amount than when the temperature of said filter is equal to or higher than said predetermined filter temperature.

3. The exhaust gas purification system for an internal combustion engine as set forth in claim 1, wherein the controller is configured to, when the rate of NOx reduction in said NOx selective reduction catalyst supported on said filter is lower than a predetermined rate of reduction when the temperature of said post-catalyst at the time the execution of said filter regeneration processing is requested is lower than said predetermined activation temperature, to:
   inhibit execution of the control of increasing the flow rate of the exhaust gas; or increase the flow rate of the exhaust gas by a lesser amount than when the rate of NOx reduction in said NOx selective reduction catalyst is equal to or more than said predetermined rate of reduction.

* * * * *